Nov. 24, 1964     H. S. CAMPBELL     3,158,357
CARGO PICK-UP FOR HELICOPTER TYPE AIRCRAFT
Original Filed June 17, 1959     3 Sheets-Sheet 1
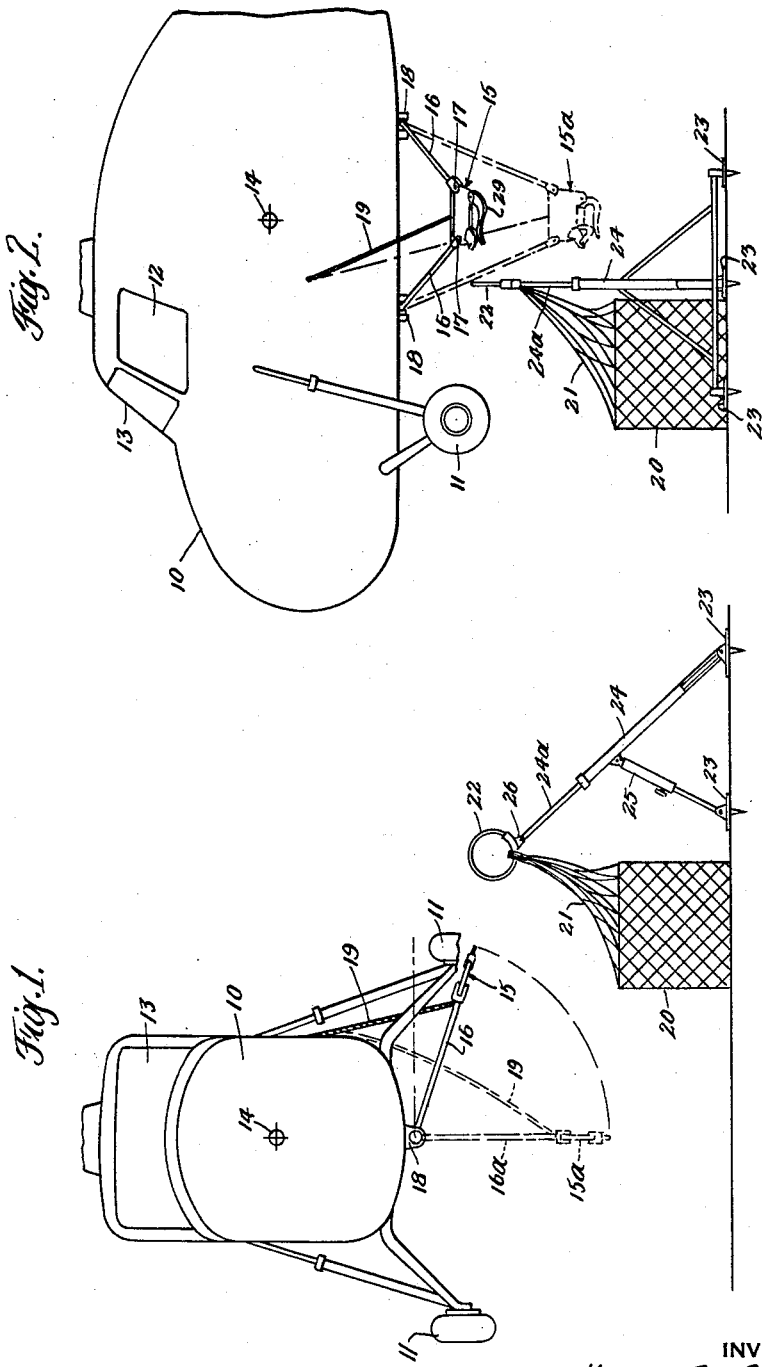
INVENTOR
HARRIS S. CAMPBELL
BY
ATTORNEY

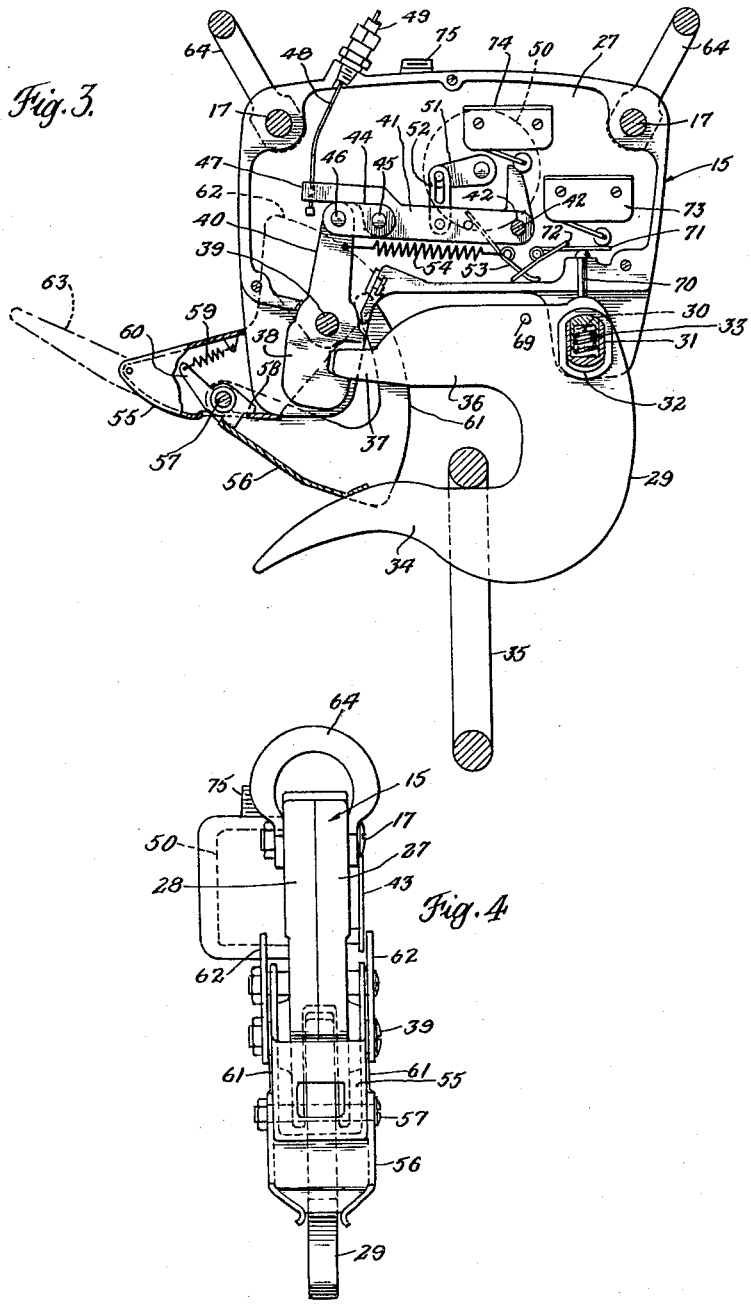

Nov. 24, 1964  H. S. CAMPBELL  3,158,357
CARGO PICK-UP FOR HELICOPTER TYPE AIRCRAFT
Original Filed June 17, 1959  3 Sheets-Sheet 3
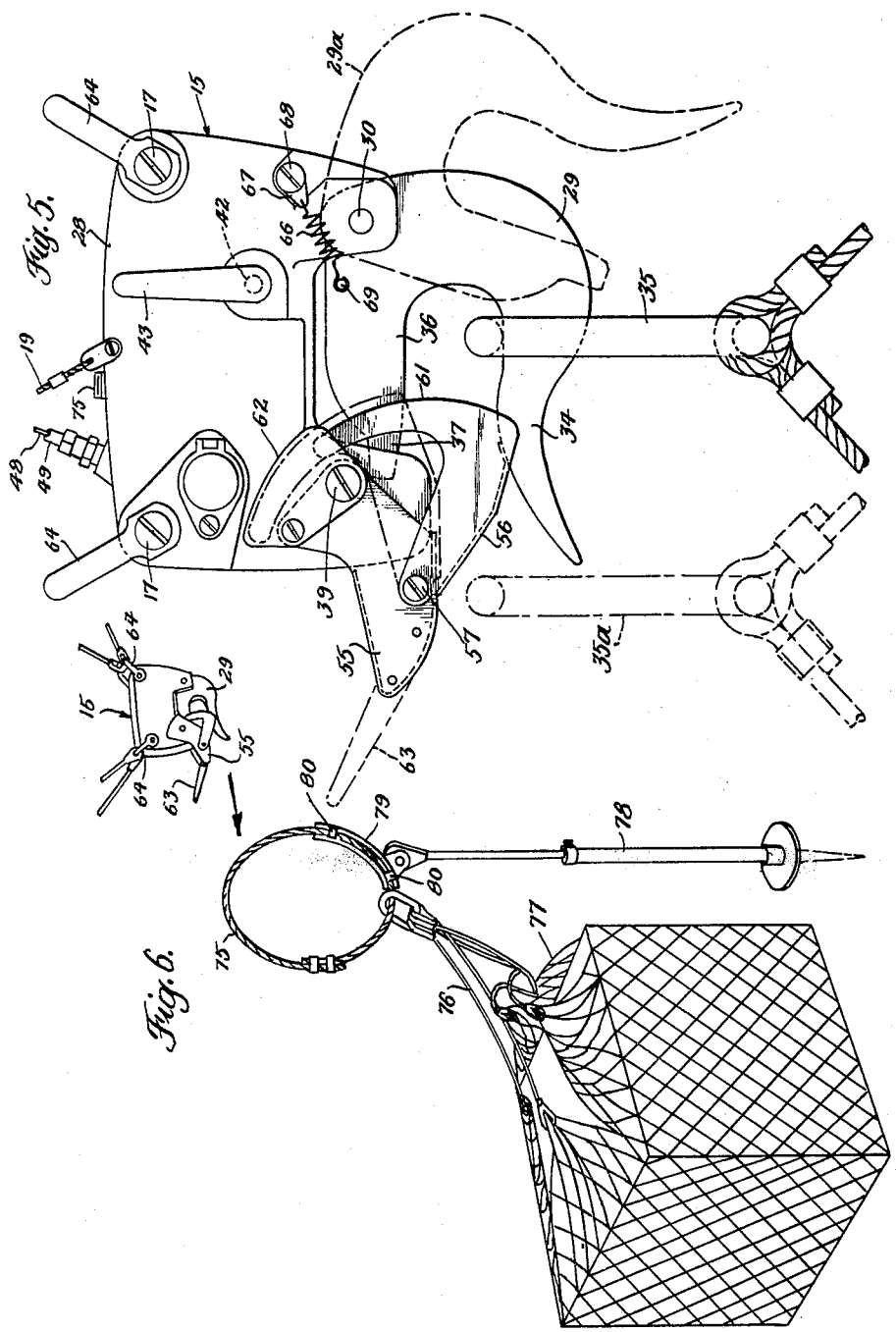
INVENTOR
HARRIS S. CAMPBELL
BY
ATTORNEY United States Patent Office 3,158,357
Patented Nov. 24, 1964

3,158,357
CARGO PICK-UP FOR HELICOPTER TYPE AIRCRAFT
Harris S. Campbell, Bryn Athyn, Pa., assignor to Eastern Rotorcraft Corporation, Doylestown, Pa., a corporation of Pennsylvania
Original application June 17, 1959, Ser. No. 821,055, now Patent No. 3,068,034, dated Dec. 11, 1962. Divided and this application Oct. 10, 1962, Ser. No. 229,714
4 Claims. (Cl. 258—1.2)

This invention relates to cargo pick-up and release systems and is particularly concerned with improvements which provide for more effective loading of hooks of the type which have remotely controlled release mechanism. This application is a division of application Serial No. 821,055, filed June 17, 1959, now Patent No. 3,068,034.

For hooks having remotely controlled release mechanism such as those used in transporting cargo slung underneath helicopters, the operation of attaching the loads to the cargo release hook has not been satisfactory. To connect a load to a hovering helicopter has heretofore required an attendant to stand directly underneath the hovering helicopter. Often the down wash from the rotor blows up dust or snow when such conditions are prevalent. To stand underneath the helicopter which may be constantly shifting position slightly under rough air conditions and to engage the cargo sling into the hook and securely close it requires a certain amount of skill and training. More time is required than desirable to accomplish the loading operation. The dangers involved in working under the hovering helicopter under adverse conditions of terrain and with obstacles in the form of items of cargo to be lifted will be obvious.

It is a primary object of the present invention to provide an improved cargo release hook construction which is capable of having its mechanism in the latched load carrying position prior to the loading operation.

Another object of the invention is to provide a hook construction which permits rapid and easy attachment of a ring connector or the like, either manually by the operator or automatically by moving the release hook into a sling ring which may be held in a predetermined pick-up position by suitable auxiliary apparatus.

A further object of the invention is the provision of suitable auxiliary equipment to assist the operation of attachment of cargo to the cargo release hook either by the operator using it to move a sling ring onto the cargo lifting hook while standing at a position safely beyond the structure of the hovering helicopter or by setting up the equipment to hold a sling ring in fixed position where the helicopter may move into position to bring the hook into contact with the ring for automatic engagement of the cargo sling to the hook.

A still further object of the invention is the provision of special supporting structure for a cargo release hook on a helicopter which permits the hook to be swung to a position where it is visible to the pilot to allow the hook to be guided into the cargo sling ring under the direct control of the pilot. After engagement the frame and hook can swing back under the helicopter where the weight is properly positioned with respect to the rotor lift.

How these and other objects and advantages of the invention are accomplished will be clear from the following description of the drawings in which:

FIGURE 1 is a front elevational view of a helicopter showing the cargo release device of the present invention attached to it.

FIGURE 2 is an elevational view showing the helicopter and release hook equipment of FIGURE 1.

FIGURE 3 is a side elevational view of the cargo release device to an enlarged scale with the front portion of the casing or frame removed and with certain parts in section to show the mechanism.

FIGURE 4 is an end elevational view of the release device of FIGURE 3.

FIGURE 5 is a side elevational view of the release device illustrating the manner in which the device may be loaded and unloaded.

FIGURE 6 is a perspective view illustrating how the release device may be operated in conjunction with accessory equipment.

Referring to the figures, FIGURES 1 and 2 illustrate how the cargo release device of the present invention may be used in conjunction with a helicopter to permit the pilot to pick up a prepared load of cargo under the direct control and observation of the pilot. In connection with the present invention, by the term "direct loading cargo release device" is meant a releasable cargo hook with provision for direct loading of a cargo sling to the hook while the hook is in latched or load carrying position. Thus it is merely necessary to apply a sling ring or similar load transfer element to the load carrying beam of the hook without the need for any closing or latching operation after placing the sling part in position.

In FIGURES 1 and 2 the helicopter fuselage is illustrated at 10, the aircraft being provided with landing wheels 11, and windows 12 and 13 in the pilot's compartment. The center of gravity of the aircraft is illustrated at 14. The direct loading cargo release device 15 is shown attached to the helicopter fuselage by means of suitable struts or rod members 16 which may be attached to the load transfer bolts 17 of the release device, the upper ends of struts 16 being attached at fittings 18 the fuselage structure by means of suitable pivots having their axes longitudinally disposed with respect to the aircraft. A cable 19 is shown attached to the release device 15 and extends upwardly into the side of the fuselage 10 where it may be reached for adjusting its position by the pilot or an attendant in the fuselage. Alternatively, a spring bias may be applied to the cable 19, the bias having sufficient capacity to balance the weight of the release device and support it in the laterally inclined position shown in full outline in FIGURES 1 and 2. In this position the release device is within the line of vision of the pilot who may view it directly through the side window 12. With this arrangement direct pick-up of the load may be accomplished.

To assist in the pick-up of the load certain accessory equipment such as illustrated in FIGURES 1 and 2 may be used. Here the cargo load 20 is shown with a suitable sling net 21 having a ring 22 attached thereto. To hold the ring 22 at the proper height and attitude an adjustable accessory structure may be used. This is illustrated as a tripod frame having supporting pads 23, a main structure 24 having a telescoping part 24a, and an adjustable strut 25 to position the main frame 24. At the upper end of frame part 24 a ring engaging fitting 26 retains the ring 22 in proper adjusted position. Ring 22 may readily be lifted out of supporting part 26 by either upper or horizontal application of load.

With this equipment the pilot can accurately control the helicopter into position so that he can engage the load carrying beam 29 of the release device 15 into the ring 22. As soon as the engagement of the beam 29 with the ring 22 is completed the helicopter may be moved directly over the load and the load lifted off with the struts 16 and the release device 15 swinging down to its vertical pendular position shown by chain dotted outline at 15a and 16a. To permit this the cable 19 is released before application of the weight of the cargo to the release device or if the cable 19 is spring loaded the weight of the cargo automatically brings the release device 15 down into vertical load carrying position. In this position the load is carried substantially directly below the center of gravity 14 of the aircraft. The helicopter may then transport the load to its destination where unloading may be accomplished in a manner which will be clear from the following description of the release device.

Referring to FIGURES 3, 4 and 5 the construction of the release device 15 will be observed. The housing or frame incorporates the back part 27 which supports in part the mechanism for the release device. The front part 28 of the frame is shown in FIGURES 4 and 5 but is removed from FIGURE 3 to disclose the interior mechanism. At the lower side toward one end of frame parts 27, 28 a load carrying beam 29 is supported by a pivot member 30. The pivot member 30 forms part of a trunnion structure 31 which is mounted in aperture 32 in the beam part 29, lost motion being provided between trunnion structure 31 and the aperture 32. A spring 33 is incorporated in the trunnion structure 31 to provide for shift in the trunnion position in the aperture to give automatic touch down operation as will be described later. The lower portion of the beam 29 extends as a cantilever beam part 34 in a direction generally parallel to the lower edge of frame parts 27, 28. This cantilever beam part 34 is shaped preferably with the inner portion adapted to engage a load sling ring 35 or similar suitable load carrying member. The outer end portion of the cantilever beam part 34 is preferably tapered and shaped to assist in the operation of inserting a sling part into load carrying position on the beam. The beam 29 is equipped with an upper arm portion 36 which extends generally parallel to the cantilever beam part 34, although arm portion 36 is somewhat shorter. In the form shown the arm portion 36 and the beam part 34 of the load beam 29 form generally a U shape with the pivot located near the closed end of the U. The tip 37 of the arm portion 36 is shaped to engage a latch part 38 which forms part of the retention mechanism. A pivot 39 supports the latch 38 in the frame parts 27, 28 and an arm 40 connected to the latch part 38 extends upwardly into the frame.

Additional retention mechanism includes a lever or link 41 which is mounted in the frame parts 27, 28 by means of pivot 42. A portion of pivot 42 extends through the front frame part 28 and is connected to handle 43 to provide for manual release by a ground crew member when desired. Near the other end of lever 41 a pair of side plates or toggle plates 44 are supported by pivots 45 and 46 connecting the plates 44 to the lever 41 and the end of arm 40 respectively. A tip portion 47 of the lever 41 extends beyond the top of arm 40 and acts as a positioning stop for the closed position of the linkage mechanism. A cable 48 is adapted to engage the end of lever 41 and extends upwardly through a flexible tubular cover 49 to the point where the manual control is located.

In addition electrical control of the release mechanism is provided. A rotary solenoid 50 is supported on the back frame 27 and when energized actuates an arm 51 which is connected by means of connecting link 52 attached to lever 41. Thus either movement of manual cable 48 or movement of arm 51 under electrical energization will raise the lever arm 41 and through the medium of the toggle plates 44 will swing the latch part 38 to release position where the tip 37 of arm portion 36 is released thereby allowing the load beam 29 to swing downwardly to its release position as in the dotted outline in FIGURE 5. A torsion spring 53 provides for urging the lever 41 to closed or latched position and a coil spring 54 urges latch arm 40 toward open or released position. Thus the mechanism is held in either open or closed position until a force is applied to the proper parts to move it. Closing is accomplished by swinging the beam 29 until the end 37 of the arm 36 engages the upper lip of the latch to urge the mechanism to closed or latched position.

To provide for easy loading of the hook with the beam 29 in loading position a frame extension 55 which may be integral with the frame parts 27, 28 if desired, is provided for supporting a keeper element 56. Extension 55 is shaped to give a guiding surface for loading the beam 29. One end of keeper element 56 is supported by a pivot 57 on the extension 55. A stop 58 prevents the keeper 56 from extending beyond the full line position illustrated in FIGURE 3. A spring 59 attached to arm 60 urges the keeper to the full line position. The side plates of the keeper 56 are provided with extensions 61 which extend to enclose the load carrying portion of the beam part 34. Thus once the sling part 35 has been placed in the position shown in FIGURE 3 it cannot be removed by pressure on the inside of keeper 56, the inside surface being radial so that pressure applied thereto will not cause opening of the keeper. However since the spring 59 is relatively weak, entry of the ring 35 from the outside position shown by chain dotted outline in FIGURE 5 at 35a is easily accomplished inasmuch as only extremely light pressure is required to divert the keeper 56 upwardly and allow the ring 35 to move into the loaded position. Spring 59 returns the keeper to its retaining position. The upper ends of the extensions 61 of the keeper are protected and guided by plates 62 when the keeper element is swung upwardly to the load inserting position.

An extension element 63 which is shown in chain dotted outline in FIGURES 3 and 5 may be connected to the frame extension 55 to provide an additional guide to assist in making an automatic pick-up of the load when the cargo release device is being used in this manner. Shackles 64 are connected to the frame by bolts 17 when it is desired to support the cargo release device by a sling. For special mountings the shackles 64 may be omitted and the release device mounted directly by bolts 17, for example, as described in connection with FIGURES 1 and 2.

For automatic reclosing of the load carrying beam part 29 after it has been released, a return spring 66 may be used. One end of return spring 66 may be connected to a fitting 67 held by the bolt 68. The other end of the spring 66 is attached to a suitable fitting or stud 69 connected to the beam 29. When the beam 29 is fully opened to its maximum, as indicated by chain dotted outline 29a in FIGURE 5, the spring 66 will be positioned at approximately dead center relationship with the pivot 30. However in this position the weight of the beam part 29a will cause it to start moving toward closed position after which the tension of spring 66 provides sufficient force to swing the beam 29 back up against the latch 38 to cause it to close ready for the next loading operation.

Automatic touch down of load may be accomplished when the weight is removed from beam 29 by setting the load down at its destination. This removes the weight of the cargo and permits the spring 33 to raise the beam 29 on its trunnion to cause movement of the cylindrical member 70 which in turn moves the actuator beam 71 against the pressure of spring 72 thus urging the electrical switch 73 to closed position. When the pilot or operator has closed the touch down arming switch in the circuit this closing of switch 73 energizes the solenoid circuit and causes release of the mechanism thereby permitting the beam 29 to swing to release position under the influence of the weight of the sling parts. In order for the automatic touchdown to operate properly it is necessary that the weight of the sling parts be great enough to overcome the influence of the spring 66. Inasmuch as the beam 29 for a cargo release device of 5,000 pounds operating capacity will weigh about three pounds, the strength of spring 66 need only be great enough to handle this three pounds with a slight excess capacity. The normal sling weight for a load of this weight will be in excess of six pounds which will be adequate to provide for touchdown operation.

Switch 74 is provided to cause interruption of the solenoid circuit when the mechanism is opened and thus protects the solenoid. The electrical system is not part of the present invention per se, a suitable system being shown in my co-pending application Serial No. 506,526 filed May 6, 1955, now Patent No. 2,904,369, dated Sept. 15, 1959. The electrical connector 75 is provided to allow making the necessary electrical circuit connection with the operator's compartment.

FIGURE 6 illustrates how the cargo release device of the present invention may be used for automatic loading in conjunction with special sling supporting equipment. In the form shown in FIGURE 6 the cargo release may be suspended underneath the helicopter where it cannot be seen by the operator. With this system, by means of signals or intercommunication system directions either from a ground assistant or a crewman aboard the helicopter, the pilot may maneuver his craft to accomplish direct pick-up of the load. To make the problem of contacting the hook easier, a large diameter ring may be used in connection with the sling equipment. This is illustrated in FIGURE 6 as a ring 75 formed from relatively flexible cable. The ring 75 is attached to the sling 76 which in turn is connected to the cargo net 77. The ring 75 is sufficiently rigid to hold its shape against the application of slight loads and thus can be held in position on the adjustable standard 78 which has a ring attaching fitting 79 to engage the ring 75 and support it in loading position by means of spring clips 80. The use of the extension guide 63 assists in directing the ring 75 into position to engage the upper side of the hook part 34 near its outer end and in so moving into position it deflects the keeper 56 to allow the ring 75 to enter into the load carrying section of the beam 29. Once the engagement has been completed the helicopter may lift the load upwardly and this action causes disconnection of the ring 75 from the clips 80. When the load is suspended from the ring 75 it assumes a shape which is elongated with the two sides of the rings substantially parallel. The cable ring 75 thus carries the load in tension. In this way a large diameter ring may be provided at low weight.

While I have described mainly the operation of the cargo release device in conjunction with lifting loads by helicopter it will be obvious that this equipment will be equally suitable for other types of cargo handling equipment where direct loading of the cargo and remote release is desirable. Also the operation of manually loading this type is greatly simplified over previous release hooks. An operator may quickly insert a sling ring while standing at arms length or may use a short rod to place the ring in position. No time is lost to see that the release hook is properly closed since proper loading is clearly evident.

From the foregoing it will be evident that I have provided relatively simple mechanism for direct loading of a cargo release device. A portion of the mechanism is similar to the mechanism used with previous type cargo release hooks, which required a closing operation after the load was placed in position on the load carrying beam. The present release device represents therefore an improvement on these previous devices, the act of moving the sling part into position past the keeper and onto the load carrying portion of the beam being all that is required to accomplish loading. By suitably shaping the end of the cargo load carrying beam and the frame extension a configuration suitable for use with automatic loading systems is produced where the release hook may be guided to engage a ring supported in position to receive it. The accessory equipment in the form of special rings and sling supporting structures which may be preset in position further assist in the operation of direct automatic loading of the cargo release device.

I claim:

1. A direct loading cargo pick-up system for aircraft of the helicopter type including
   (a) a structural frame, having depending struts,
   (b) a pivotal attachment structure between said struts and an aircraft,
   (c) a cargo hook attached to the lower end of said frame, said cargo hook having a generally horizontally loading cantilever beam and having remotely operable release mechanism,
   (d) a position adjusting control element connected to said structural frame and extending to an aircraft fuselage,
   (e) said frame being swingable about a longitudinal axis on its pivotal structure from a laterally disposed position where the cargo hook is positioned to extend beyond an aircraft fuselage during pick-up to a pendular stable position underneath an aircraft fuselage.

2. A direct loading cargo pick-up system for a helicopter type aircraft, including
   (a) a depending structural frame having a plurality of members located in a downwardly converging direction,
   (b) a cargo hook having a generally horizontally loadable beam attached near the lower convergence of said members, said cargo hook having remote control release mechanism,
   (c) pivotal structure to connect said frame to the aircraft on a longitudinal axis,
   (d) said frame being proportioned to swing from a load carrying position where the cargo hook is suspended below the longitudinal axis of the aircraft to a load engaging position where the cargo hook is at a laterally disposed position with respect to the longitudinal axis of the aircraft,
   (e) and a frame position control element structurally connected to said frame and extending to the aircraft.

3. A direct loading cargo pick-up system for a helicopter type aircraft, including
   (a) a structural frame located beneath the aircraft,
   (b) a pivotal structure to connect said frame to the aircraft on an axis parallel to the longitudinal axis of the aircraft,
   (c) a remotely releaseable cargo hook having a direct loading beam structure supported on said structural frame,
   (d) and a frame position control element having a connection to said frame and extending to the aircraft to allow positioning of said frame in different locations with the cargo hook either laterally disposed with respect to the longitudinal axis of the aircraft for load engagement or in the vertical plane of the longitudinal axis of the aircraft for load carrying purposes.

4. A direct loading cargo pick-up system for attachment to the fuselage of a helicopter type aircraft, including
   (a) a structural frame having a plurality of strut members,
   (b) pivotal structure having an axis connecting said frame to the aircraft, said axis being located in a vertical plane through the longitudinal axis of the aircraft,
   (c) a cargo hook having remote release mechanism and having a cantilever load beam adapted for direct pick-up operations attached to said frame opposite said pivotal structure,
   (d) and a frame positioning element attached near the lower end of said frame and extending to the aircraft,
   (e) the length of said element being adjustable to allow said frame to swing on the pivotal structure either to a load carrying position directly under the aircraft or to a laterally extending position, (f) the length of the struts of said frame providing for positioning of said cargo hook beyond the aircraft fuselage when the frame is in the laterally extended position.

References Cited in the file of this patent

UNITED STATES PATENTS

| | | |
|---|---|---|
| 2,017,081 | Trusty | Oct. 15, 1935 |
| 2,319,881 | Ray | May 25, 1943 |